Oct. 26, 1948.          R. REGER          2,452,208
VELOCITY GOVERNOR
Filed Oct. 21, 1943                    2 Sheets-Sheet 1
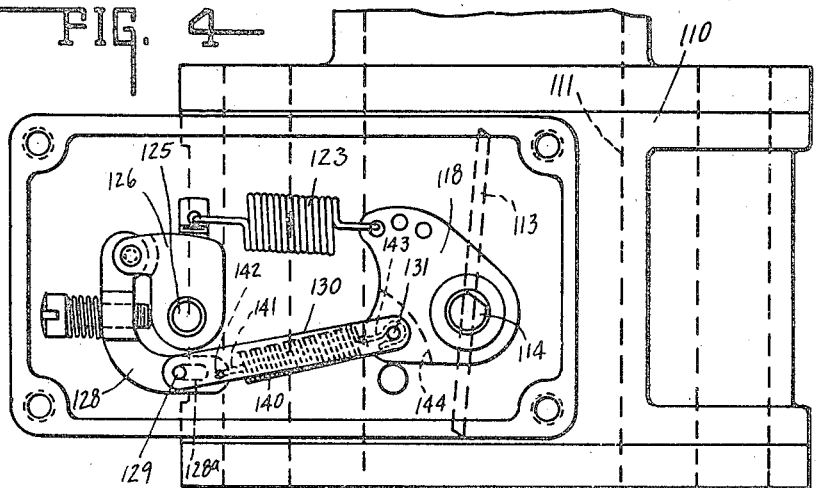
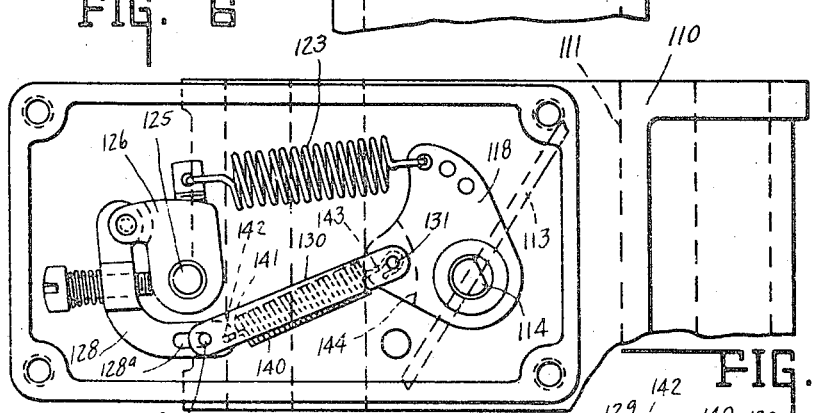
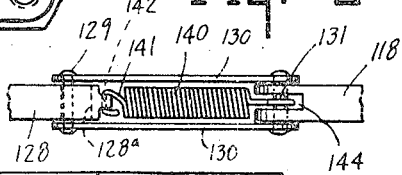
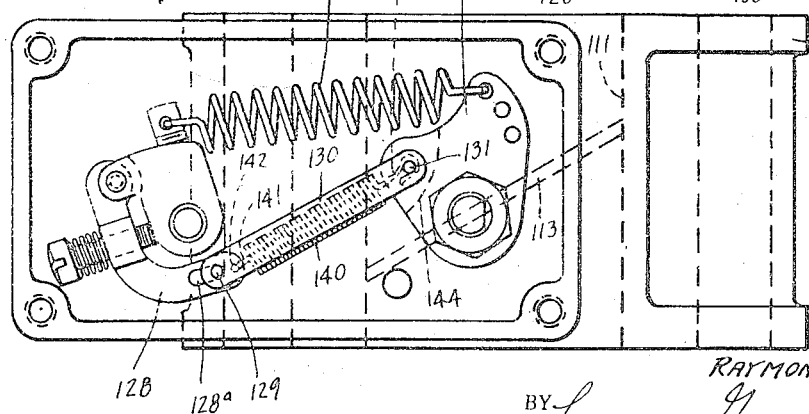
INVENTOR.
RAYMOND REGER.
BY Lockwood, Goldsmith & Galt,
ATTORNEYS.

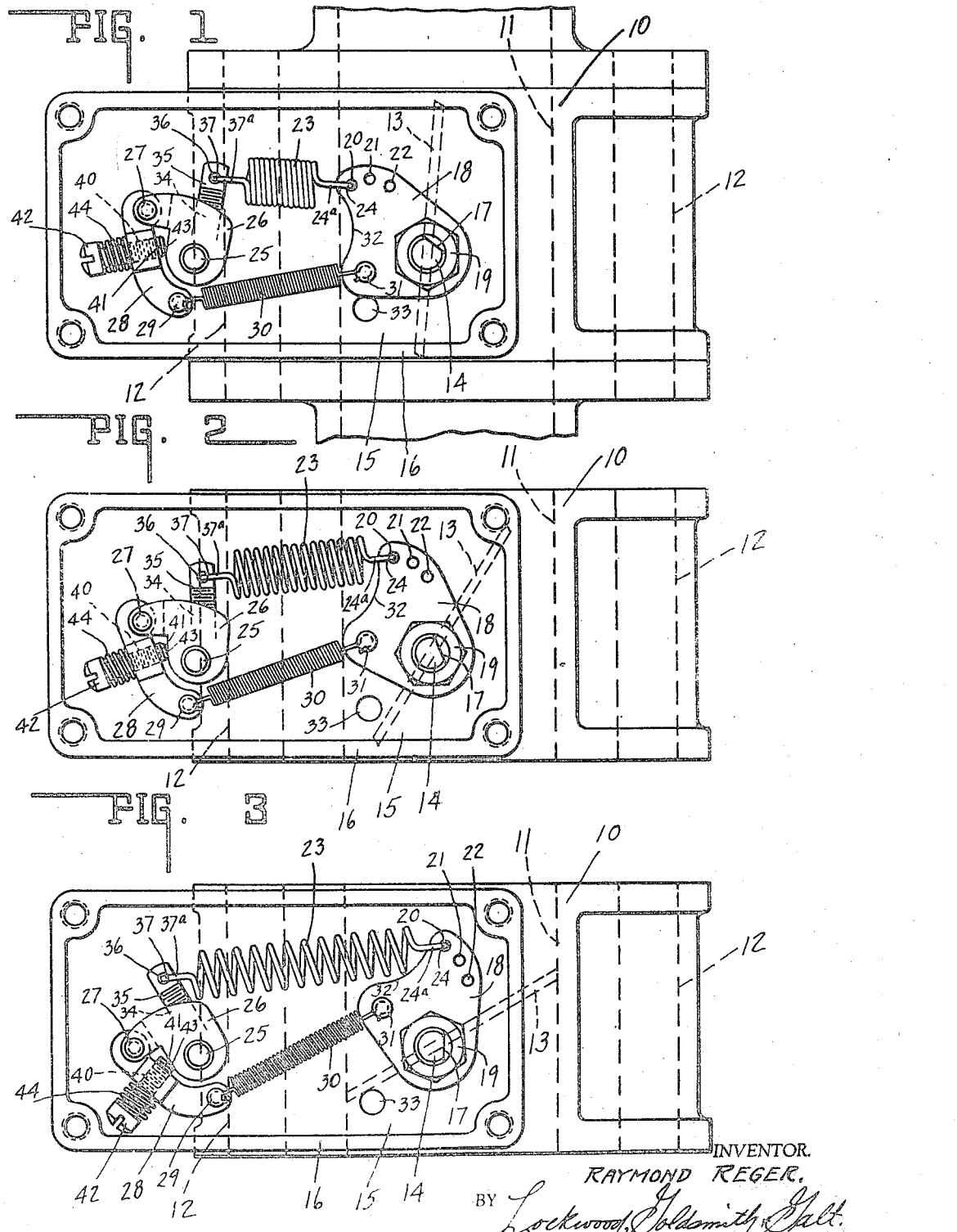

Patented Oct. 26, 1948

2,452,208

UNITED STATES PATENT OFFICE 2,452,208

VELOCITY GOVERNOR

Raymond Reger, Anderson, Ind., assignor to
Pierce Governor Company, Anderson, Ind.

Application October 21, 1943, Serial No. 507,086

10 Claims. (Cl. 267—1)

This invention relates to a velocity governor and more particularly the mechanism for opposing the velocity effect valve torque so that the engine associated with such governor will be controlled thereby and held to a safe speed.

Such governors broadly are well known in the art, see Essex Patent No. 1,820,384 dated August 25, 1931, and usually include a throttle body interposed between the carburetor and intake manifold of the engine to be governed. In the intake portion of such throttle body and eccentrically of the axis thereof is pivotally mounted the governor valve usually of, but not necessarily restricted to, a butterfly shape. The valve is mounted off-center with the major portion directed upstream so that the velocity of the fuel downstream toward the engine and from the carburetor will tend to close the valve.

This closing tendency of the valve, accordingly, is opposed by a resistance force. The adjusted value of this force determines the governed speed of the engine.

One chief object of this invention, as well as others subsequent to the said Essex patent, is to simplify the construction of mechanism utilized to apply the aforesaid resistance to valves to oppose the velocity torque thereof.

Another chief object of the present invention is to reduce or substantially eliminate hunting or surging in such a governor, an inherent characteristic of most velocity governors.

The chief feature of the present invention resides in the simple form of mechanism utilized which accomplishes the foregoing duel objectives and which furthermore eliminates all cams or wearing parts.

Other objects and features of the invention will be set forth more fully hereinafter.

The full nature of the invention will be understood from the accompanying drawings and the following description and claims:

In the drawings,

Fig. 1 is a side elevation of a velocity governor throttle body with cover removed to show the opposing force producing mechanism, dotted lines illustrating the intake portion and governor valve of said governor, parts being shown in the position in which the valve is nearly wide open, that is closed about five degrees of valve travel.

Fig. 2 is a similar view of the same parts showing the same in about the valve half closed position, that is about thirty-two and a half degrees of valve travel from open valve position.

Fig. 3 is a similar view of the same parts showing the same in about the valve fully closed position, which herein is illustrated as about sixty degrees of valve travel from open valve position.

Fig. 4 is a side elevation of a modified form of the invention, the opposing force producing mechanism and the control valve (dotted) being shown in the valve open position, similar to Fig. 1.

Fig. 5 is a bottom plan view of such mechanism.

Fig. 6 is a view similar to Fig. 4, but with parts shown in the intermediate position, substantially corresponding to the position shown in Fig. 2.

Fig. 7 is a view similar to Figs. 4 and 6, but with parts in the closed valve position and corresponding to the position shown in Fig. 3.

Herein the velocity governor illustrated in Figs. 1 to 3 is arranged for interpositioning between a down draft carburetor and an engine manifold, the fuel mixture flowing downward from the carburetor to the manifold through the matching intake portion 11 of the throttle body 10 having parallel bores 12 therethrough and at opposite sides of the intake portion.

Pivotally mounted eccentrically of and in the intake is the governor valve 13, the same being supported eccentric of or offset from its median axis. The supporting shaft may take several well known forms, or may be separated with the valve therebetween. Herein 14 indicates the end of such a shaft structure which projects into control chamber 15 formed by walls 16 integral with the throttle body 10 and said chamber is closed by a cover plate not shown. All of the foregoing is conventional to the art of velocity governors.

The end of shaft 14 is flattened as at 17 and a lever arm 18 is retained thereon as by nut 19, etc.. This arm herein includes at its outer end an aperture 20. (The radius from aperture 20 to shaft 14 is offset or lags (counter-clockwise) from the plane of the valve.) Other holes 21 and 22 are provided for initial spring force adjustment purposes. Each hole constitutes an anchorage for a coiled tension spring 23 having hook end 24 selectively associated with one of the aforesaid apertures.

The end 24 is elongated at 24a, so that it can lie alongside of plate arm 18 when end 24 is seated in any aperture 20, 21 or 22 which insures non-interference between spring 23 and arm 18. Each successive aperture 20, 21 and 22 is radially closer to the valve shaft axis and the plane of the valve. With this arrangement the initial force imposed by the spring 23 upon the valve at wide open or immediately adjacent wide open position can be adjusted.

In chamber 15 there is provided a stationary shaft 25 upon which is pivotally mounted one end of a member 26, which is generally L-shaped. The other end of member 26 is pivotally connected at 27 to another member 28 that is arched in general outline. Members 26 and 28 constitute a second lever arm and are adjustable relative to each other, but normally operate as a rigid arm unit.

The other end of member 28, as at 29, is connected to one end of a normally inextensible means 30, the other end thereof being connected at 31 to arm 18. The arm 18 is relieved or cut away at 32 to provide clearance for spring 23 in its extension incident to clockwise rotation of arm 18 due to the velocity effect on the valve.

Since the means 30 is normally inextensible for the major portion of the valve travel from wide open toward closed position, it follows that as arm 18 rotates in the closing direction, the member 28 is pulled counter-clockwise about pivot 25 and with the member 26 following.

A stop 33 in chamber 15 is engaged by arm 18 and limits the valve 15 to slightly off-center from wide open position, see Fig. 1.

The member 26 threadedly supports at 34 a threaded stud 35 apertured at 36 to receive the other hook end 37 of spring 23, said hook end also being elongated at 37a for clearance purposes. The purpose of threadingly mounting stud 35 is to provide an adjustment by which surging is substantially eliminated or very materially reduced. Note by moving hole 36 away from shaft 25 the amount of surge is decreased.

The member 28 has a tapped hole 40 therethrough. A threaded bolt 41, having head 42 and bearing 43 at opposite ends, is adjustably mounted in the tapped hole. A spring 44 concentric with the bolt normally engages member 28 and thus the degree of collapse between members 26 and 28 is determined.

If bolt 41 is threaded toward member 26, since means 30 is relatively inextensible at wide open throttle, member 26 of necessity must rotate counter-clockwise to accommodate such bolt adjustment, and since arm 18 now bears on stop 33, the spring 23 is stretched initially to the desired degree. This in effect is a speed adjustment for the governor.

While the means 30 might be a rigid member pivotally connected at 29 and 31 to member 28 and arm 18, respectively, it is preferred in one embodiment to make this member a strong closely coiled spring having a strength far greater than spring 23, so that over the greater part of the entire range of valve movement towards closed valve position, said spring 30 does not extend. However, just before the valve closes said spring does slightly extend so that it, in effect, cushions the closing action of said valve 13.

Reference will now be had to Figs. 4 to 7, inclusive, wherein a second embodiment of the invention is illustrated. In these figures, numerals of the one hundred series indicate parts identical or similar to corresponding parts designated by the corresponding primary numerals in Figs. 1 to 3.

This embodiment of the invention generally may be differentiated from that initially described by pointing out that in lieu of rigid (spring) member 30 pivoted at 31 to arm 18 and pivoted at 29 to member 28, the present connection includes a pair of links 130 connected together by pin 129 that rides in a slot 128a in member 128. The other ends of the links 130 straddle plate member 118 and are pivoted by member 131 thereto.

Herein a spring 140 has one end 141 anchored to aperture 142 in member 128 and its opposite end 143 is anchored to plate 118 by engaging member 131 exposed by slot 144 in said plate.

The operation of this form of the invention, in general, is similar to that illustrated in Figs. 1 to 3.

The spring 140 and slip link linkage 130 between members 128 and 118 operated as a unit.

When valve 113 is wide open, see Fig. 4, the slip link will have pin 129 in the left end of slot 128a in member 128 due to the tension of the lower spring 140 between the two members 128 and 118 for at low speed the load spring has little force. As valve 113 moves slightly towards the closed position, see Figs. 6 and 7, the pin 129, then in the left end of slot 128a will move to right end of said slot. This action takes place because rate of top or load spring 123 is greater than rate of lower or auxiliary spring 140 between slip links 130.

As the valve travels from position in Fig. 6 to closed position, see Fig. 7, the slip linkage 130 acts as a solid link and extends load spring 123, member 118 thus acting upon both ends of spring 123.

The advantage of this arrangement is that the lower rate spring 140 will pull the valve completely open, even when the main governor spring 123 is adjusted for very low speeds. In other words, the lower rate spring 140 will help to keep the full load speed of the engine up even after the main spring 123 is inoperative. Another advantage of this spring 140 and slip link 130 combination is that the low rate of the auxiliary spring 140 will help to prevent high overrun, especially when shifting gears on automotive work. This arrangement cushions the overrun at shut-off, that is governed speed.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A spring resistance device comprising an arm responding to a variable force to be resisted, a second arm pivotally supported adjacent the first mentioned arm, an extensible spring connecting the arms together, and means, normally inextensible over the greater portion of the first mentioned arm movement in one direction, operatively connecting the arms together for simultaneous oppositely directed rotation of said arms, the second mentioned arm being of two-part character, said parts having pivotal connection therebetween and being normally collapsed together at all times, the last mentioned means being connected to one part and the extensible spring to the other part.

2. A spring resistance device comprising an arm responding to a variable force to be resisted, a second arm pivotally supported adjacent the first mentioned arm, an extensible spring connecting the arms together, and means, normally inextensible over the greater portion of the first mentioned arm movement in one direction, operatively connecting the arms together for simultaneous oppositely directed rotation of said arms, the second mentioned arm being of two-part character, said parts having pivotal connection therebetween and being normally collapsed together at all times, the last mentioned means being connected to one part and the extensible spring to the other part, and an adjustable stop interposed between the collapsed parts for determining the collapsed relative positions of said parts.

3. A spring resistance device comprising an arm responding to a variable force to be resisted, a second arm pivotally supported adjacent the first mentioned arm, an extensible spring connecting the arms together, and means, normally inextensible over the greater portion of the first mentioned arm movement in one direction, operatively connecting the arms together for simultaneous oppositely directed rotation of said arms, the second mentioned arm being of two-part character, said parts having pivotal connection therebetween and being normally collapsed together at all times, the last mentioned means being connected to one part and the extensible spring to the other part, the last mentioned connecting means, at least at the first mentioned arm extreme position when subjected to maximum variable force, is slightly stretched and arranged to cushion the final movement of the first mentioned arm to that extreme position.

4. A spring resistance device comprising an arm responding to a variable force to be resisted, a second arm pivotally supported adjacent the first mentioned arm, an extensible spring connecting the arms together, and means, normally inextensible over the greater portion of the first mentioned arm movement in one direction, operatively connecting the arms together for simultaneous oppositely directed rotation of said arms, the second mentioned arm being of two-part character, said parts having pivotal connection therebetween and being normally collapsed together at all times, the last mentioned means being connected to one part and the extensible spring to the other part, and an adjustable stop interposed between the collapsed parts for determining the collapsed relative positions of said parts, the last mentioned connecting means, at least at the first mentioned arm extreme position when subjected to maximum variable force, is slightly stretched and arranged to cushion the final movement of the first mentioned arm to that extreme position.

5. A spring resistance device comprising an arm responding to a variable force to be resisted, a second arm pivotally supported adjacent the first mentioned arm, an extensible spring connecting the arms together, and means, normally inextensible over the greater portion of the first mentioned arm movement in one direction, operatively connecting the arms together for simultaneous oppositely directed rotation of said arms, the second mentioned arm being of two-part character, said parts having pivotal connection therebetween and being normally collapsed together at all times, the last mentioned means being connected to one part and the extensible spring to the other part, and adjustable connections between the extensible spring and each of the arms, one connection determining the initial spring force, and the other connection determining the amount of surge to which the first mentioned arm may be subjected.

6. A spring resistance device comprising an arm responding to a variable force to be resisted, a second arm pivotally supported adjacent the first mentioned arm, an extensible spring connecting the arms together, and means, normally inextensible over the greater portion of the first mentioned arm movement in one direction, operatively connecting the arms together for simultaneous oppositely directed rotation of said arms, the second mentioned arm being of two-part character, said parts having pivotal connection therebetween and being normally collapsed together at all times, the last mentioned means being connected to one part and the extensible spring to the other part, and an adjustable stop interposed between the collapsed parts for determining the collapsed relative positions of said parts, adjustable connections between the extensible spring and each of the arms, one connection determining the initial spring force, and the other connection determining the amount of surge to which the first mentioned arm may be subjected, and a stop limiting the travel of the first mentioned arm.

7. A spring resistance device comprising an arm responding to a variable force to be resisted, a second arm pivotally supported adjacent the first mentioned arm, an extensible spring connecting the arms together, and means, normally inextensible over the greater portion of the first mentioned arm movement in one direction, operatively connecting the arms together for simultaneous oppositely directed rotation of said arms, one of the arms being of two-part character, said parts having pivotal connection therebetween and being normally collapsed together at all times, the last mentioned means being connected at one end to one of said parts and the extensible spring being connected at one end to the other of said parts.

8. A spring resistance device comprising an arm responding to a variable force to be resisted, a second arm pivotally supported adjacent the first mentioned arm, an extensible spring connecting the arms together, and means, normally inextensible over the greater portion of the first mentioned arm movement in one direction, operatively connecting the arms together for simultaneous oppositely directed rotation of said arms, the second mentioned arm being of two-part character, said two parts having pivotal connection therebetween and being normally collapsed together at all times, one part having its remote end connected to one end of the spring and the other part having its remote end connected to one end of the last mentioned means, the latter being of extensible linkage type and including a pin and slot connection of one end of the linkage to one of the arms.

9. A spring resistance device comprising an arm responding to a variable force to be resisted, a second arm pivotally supported adjacent the first mentioned arm, an extensible spring connecting the arms together, and means, normally inextensible over the greater portion of the first mentioned arm movement in one direction, operatively connecting the arms together for simultaneous oppositely directed rotation of said arms, the second mentioned arm being of two-part character, said two parts having pivotal connection therebetween and being normally collapsed together at all times, an adjustable stop interposed between the collapsed parts for determining the collapsed relative positions of said parts, one part having its remote end connected to one end of the spring and the other part having its remote end connected to one end of the last mentioned means, the latter being of extensible linkage type and including a pin and slot connection of one end of the linkage to one of the arms.

10. A spring resistance device comprising an arm responding to a variable force to be resisted, a second arm pivotally supported adjacent the first mentioned arm, an extensible spring connecting the arms together, and means, normally inextensible over the greater portion of the first mentioned arm movement in one direction, operatively connecting the arms together for simultaneous oppositely directed rotation of said arms, the second mentioned arm being of two-part character, said two parts having pivotal connection therebetween and being normally collapsed together at all times, one part having its remote end connected to one end of the spring and the other part having its remote end connected to one end of the last mentioned means, the latter being of extensible linkage type and including a pin and slot connection of one end of the linkage to one of the arms, and an auxiliary spring between said arms.

RAYMOND REGER.

REFERENCES CITED

The following references are of record in the file of this patent:

UNITED STATES PATENTS

| Number | Name | Date |
|---|---|---|
| 980,343 | Ross | Jan. 3, 1911 |
| 1,820,384 | Essex | Aug. 25, 1931 |
| 1,889,706 | Singer | Nov. 29, 1932 |
| 2,024,296 | Larsen | Dec. 17, 1935 |
| 2,026,947 | Leibing | Jan. 7, 1936 |
| 2,026,948 | Leibing | Jan. 7, 1936 |
| 2,127,521 | Kemp | Aug. 23, 1938 |
| 2,139,841 | Mennesson | Dec. 13, 1938 |
| 2,161,334 | Carwardine | June 6, 1939 |
| 2,338,912 | Ericson | Jan. 11, 1944 |

FOREIGN PATENTS

| Number | Country | Date |
|---|---|---|
| 25,860 | Great Britain, 1910 | Nov. 7, 1912 |